United States Patent [19]
Stolis et al.

[11] Patent Number: 5,825,945
[45] Date of Patent: Oct. 20, 1998

[54] DOCUMENT IMAGING WITH ILLUMINATION FROM LAMBERTIAN SURFACES

[75] Inventors: Paul Stolis, Canton; John D. Vala, Plymouth; Clive E. Catchpole, Birmingham; Johan P. Bakker, West Bloomfield; Gary B. Copenhaver, Canton; David J. Concannon, Farmington Hills; Robert T. Rourke; David J. Valice, both of Troy, all of Mich.

[73] Assignee: Unisys Corp, Blue Bell, Pa.

[21] Appl. No.: 883,513

[22] Filed: May 15, 1992

[51] Int. Cl.[6] .................................................. G06K 7/00
[52] U.S. Cl. ............................................................ 382/312
[58] Field of Search ..................... 382/1, 7, 65; 235/379; 356/225; 250/222.2; G06K 9/00, 9/20, 7/10, 7/14; G01J 1/42; G01V 9/04

[56] References Cited

U.S. PATENT DOCUMENTS

| | | | |
|---|---|---|---|
| 3,790,759 | 2/1974 | Mohan et al. | 250/224 |
| 3,881,102 | 4/1975 | Willits et al. | 356/400 |
| 4,511,250 | 4/1985 | Olsen | 356/225 |
| 4,731,854 | 3/1988 | Gonzalez | 382/1 |
| 4,888,812 | 12/1989 | Dinan et al. | 382/7 |
| 4,912,317 | 3/1990 | Mohan et al. | 250/222.2 |
| 5,085,517 | 2/1992 | Chadwick et al. | 356/394 |
| 5,131,755 | 7/1992 | Chadwick et al. | 356/386 |
| 5,155,776 | 10/1992 | Concannon et al. | 382/7 |

*Primary Examiner*—Jose L. Couso
*Attorney, Agent, or Firm*—M. Starr; J. McCormack; N. Cass

[57] ABSTRACT

In a check processing array, an imaging/illumination arrangement for illuminating and imaging checks at one or several imaging sites as they are rapidly, continuously transported past two or more imaging stations, each station having, as its illumination source, a hollow Lambertian integrating vessel, housing lamps which project a highly uniform, diffuse Lambertian illumination-beam to its respective imaging site.

27 Claims, 11 Drawing Sheets

DOCUMENT IMAGING WITH ILLUMINATION FROM LAMBERTIAN SURFACES

FIELD OF THE INVENTION

This invention relates to imaging of documents and more particularly to associated illumination operations facilitating the making of an electronic image of a document.

BACKGROUND, FEATURES

Figure 1A:
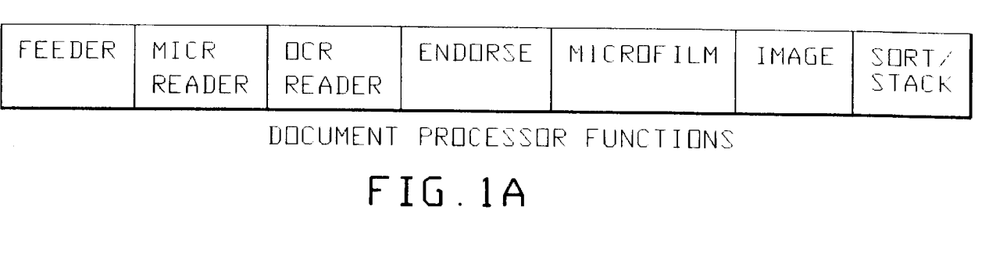

Document processing is a well developed art today; for instance, witness the processing of bank checks, remittance documents and other documents of finance handled by the millions every day in banks all over the world. To handle this incredibly large volume of paper, banks rely on high speed document processors that feed thousands of documents per minute past various processing stations. [E.g. Unisys Corp. has DP1000, DP1800 and 9195 high speed document processors that handle 1000, 1800, and 2600 documents per minute, respectively.] Processing a bank document typically involves some or all of the following steps: e.g., document-feed, reading magnetic ink recognition characters (MICR), reading optical recognition characters (OCR), printing endorsements, microfilming, sorting/stacking (routing documents to pockets), and imaging (see FIG. 1A).

Figure 1B:
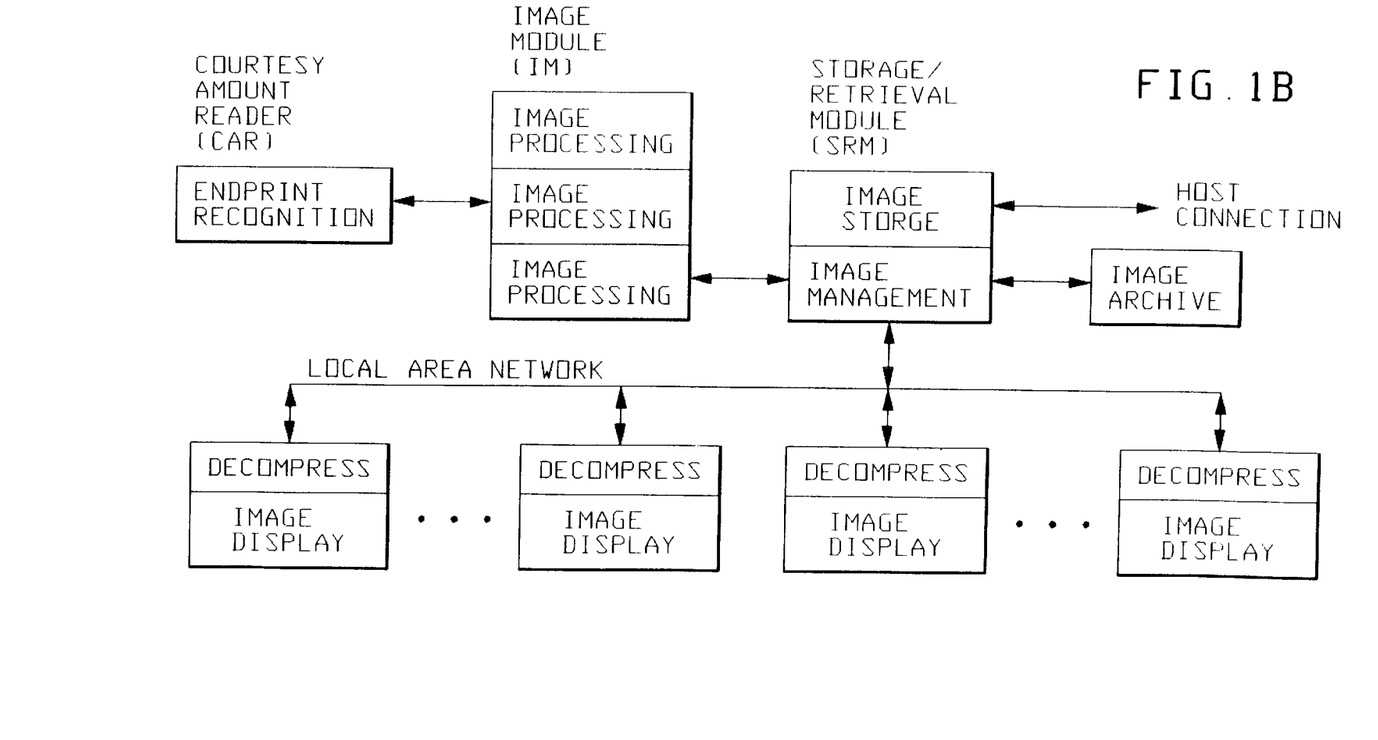
FIG. 1B is a related document imaging system, schematically indicating imaging according to an embodiment hereof, and FIG. 1C functionally indicates a number of imaging/storage units linked by a Host computer.
Figure 1C:
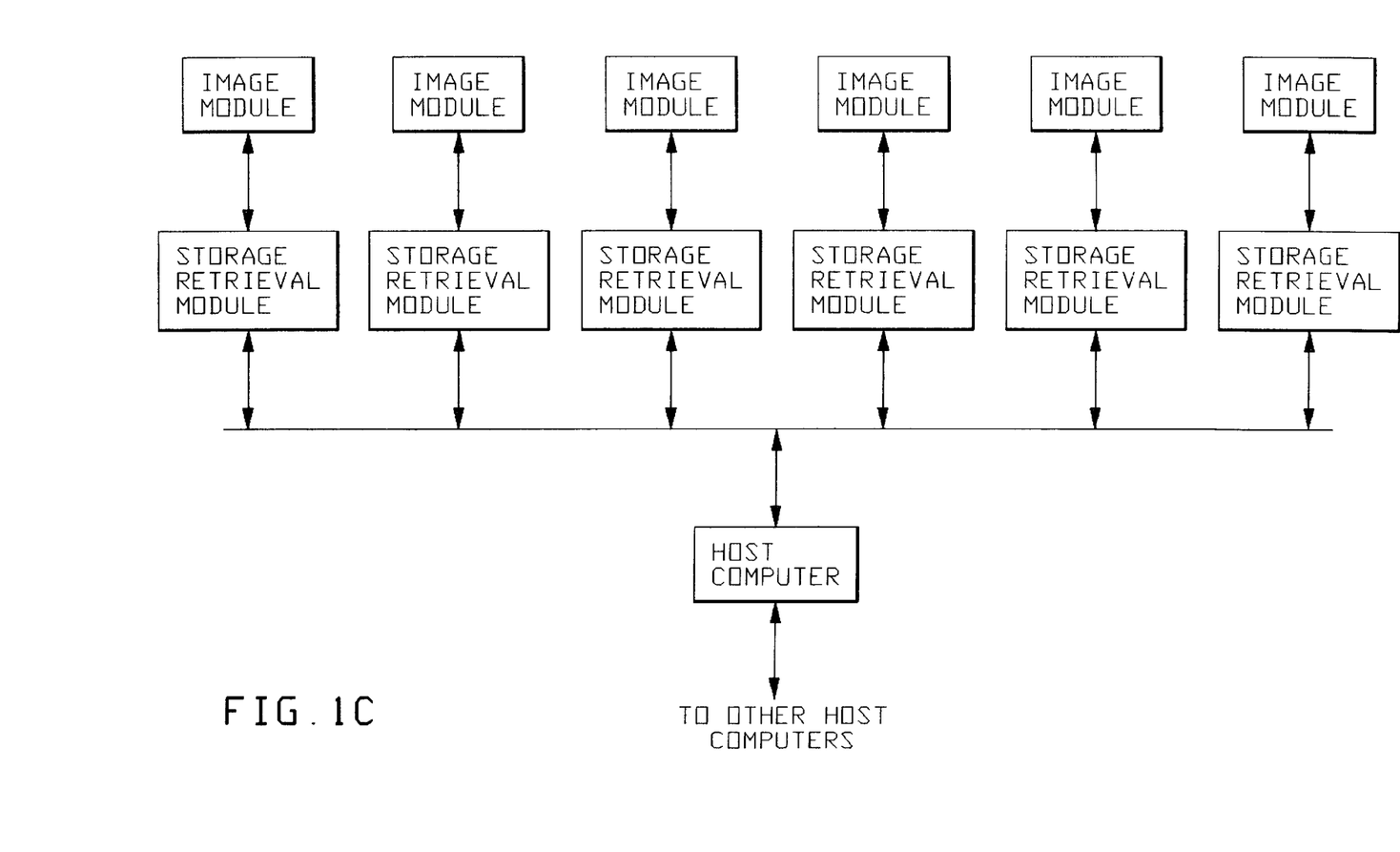

The imaging task typically involves: Acquisition, processing, compression, storage, transmission, display, printing, and archive of images. This invention involves producing an image platform apt for integration with a high speed sorter for acquisition, processing, and compression; with storage retrieval modules for storage and image management; with image workstations for display; image printers for print; with optical disk subsystems for archive, and with means to transmit images, point to point, and local area networks (see FIG. 1B). Mainframe computer "hosts" can link multiple imaging document processors, and associated storage retrieval modules and other peripherals to create a large scale system (e.g. see FIG. 1C).

For image-acquisition, we prefer to use a camera which provides the system with images of the front and rear of the processed documents; e.g. facsimile images which are adequate for a customer's needs.

THE PAPER MOVER

To fix the parameters of camera design, one must consider the mechanical transport that moves documents past the camera sensor. The document transports here contemplated can propel paper past processing stations at track speeds of 100 to 400 inches per second (ips). The 5 mil thick documents (0.005") move along a track that is made 70–90 mils wide (TRACK GAP) in order to minimize jams and accommodate staples and other foreign objects that may be still attached to a document.

Document size determines the field of view required to image a maximum-height document. Most documents here contemplated (e.g. checks) are 2.75 to 4.75 inches high and between 6 to 10 inches long. A document may exhibit "skew" as it travels through the transport and so require a field of view larger than the actual document size.

Camera design is also affected by a transport's degree of "document control", i.e. how much excess sidewise paper-motion is permitted in the area of image acquisition. Control techniques range from costly vacuum belt systems that minimize paper movement across the track to 20 mils or less, to less restrictive approaches that allow more document motion, but cost less. The tradeoff between minimum vs. maximum document control involves cost, complexity and —most important to the camera designer —the depth of illumination, and the amount of light required to properly illuminate the document in the image acquisition area.

In the instant embodiments we opt for minimal document control to reduce cost of the lower overall system and to increase transport reliability (minimize jams); thus, we must maximize the output of the illumination source —as a salient object hereof.

ILLUMINATION SOURCE

Selection of the illumination source is influenced by the depth of illumination desired and by the image sensor one selects (this dictates the sensor light input required). As documents are propelled past the image sensor at from 100 to 400 ips, there is little time to accumulate enough photons to form an acceptable image (i.e. to meet signal to noise and dynamic range requirements) so one tends to maximize light input.

There are some elegant sensor arrangements, such as time delay integration (TDI) devices, that reduce input light requirements, but these bring along their own unique set of needs such as synchronization of document motion. Also they tend to be "custom" arrangements using components with limited commercial availability and to involve package configurations (electrical and mechanical) that are non-optimal for our contemplated applications. Our image sensor of choice is a "sensor chip", such as the Reticon RL1288D, or a like chip which provides compatible output data rates of up to 80 MB/s and is priced attractively (e.g. the cost of a custom chip).

The type of light reaching our image sensor is very important for proper acquisition of color information from a document. We expect to satisfy the "eyeball test": i.e. "If I can see it on the document, I expect to see it in the image." Although "downstream processing" (after the camera acquires the image) can remove information, it cannot recover information that the camera doesn't acquire. Therefore it is important that the camera provide a representation, or facsimile, of the original document that is as faithful as possible.

Thus, the color response (spectral response) we require of our image camera will be the response of the human eye, i.e. "photopic response". Taking "photopic response" as our norm, we must factor-in the frequency response of our sensor, the output spectrum of our light source spectrum, and the effects of our optical-path-elements. To account for all these we interpose a photopic filter in the light path to the sensor —i.e. to emulate the desired photopic response.

Although photopic response is our "baseline", it is also useful to further shape sensor (spectral) response. To do this we find, we have found that a slight "red shift" (moving sensor response curve toward the red), with modifications to the response curve edge rates, gives optimal results for most applications.

GENERAL CONSIDERATIONS

One will optically-couple his light source and image sensor with suitable optics (e.g. lenses, mirrors), and prefer to package all this as an integral illuminator-camera unit which can be integrated into a pre-existing document processor. [E.g. a front and rear camera system]. The light from the illumination source will normally travel through a series of mirrors, lenses and fiber optics prior to reaching the document. A preferred lamp is a high output xenon arc lamp that is highly efficient in the visible spectrum. All the optics is optimized with reflective (AR) coatings to minimize light loss.

With a passing document so illuminated, front and rear, it can present reflected-light images to the image sensor via relay optics and an "imaging lens" specially selected to produce picture elements (or "pixels") that are properly sized for downstream image processing algorithms. An important characteristic of such imaging lenses is their magnification tolerance; i.e. the sensitivity of subsequent processing to pixel-size variation. We have taken a conservative approach here to insure highly repeatable pixel dimensionality through appropriate selection of the image lens focal length. Depth of focus or the ability to stay in focus throughout the track gap is another key design parameter.

LIGHT-TO-VOLTAGE TRANSLATION

Having brought two reflected images (reflected light from front and rear of document) to the image sensor, we next need to convert these into video signals that can be understood by our imaging electronics. The electrical signals output by our sensor chips need to be conditioned, amplified, filtered and then converted to a digital form by an analog to digital (A/D) converter.

Here, the linearity of the signal is a consideration. [Note: the response of camera electronics to light is usually linear.] Techniques to modify that response, such as using logarithmic response means, help to increase image-information at lower light levels. Whatever technique is used requires careful design and characterization to insure proper operation. One should also consider "effective grey levels" (as opposed to the number of quantitized grey levels defined by the bit width of the A/D chip); these being understood as the "real" number of grey levels present in an image. Black level stability of the camera electronics to maintain its relationship to incident reflected light is also important.

A key design parameter for a successful image camera design is cleanliness —i.e. keeping everything clean, despite an operating environment which is often laden with dust. Workers know that the myriad of documents rapidly thrust through the document processor (thousands each hour) tend to shed "paper dust". This dust accumulates rapidly and can compromise image quality; e.g. if it penetrates into the camera and settles on the wrong surfaces; "Dark images" or images with horizontal streaks can then result. Thus, our preferred illuminator-camera combination is completely sealed against dust so that no optical surfaces may be contaminated.

PROBLEMS FACED

Many difficulties and disadvantages of present systems relate to how well the paper documents tolerate processing and handling. If checks, etc. are lost or damaged by processing equipment and/or by personnel, one may find errors in reconciling and balancing document transactions and in reporting to customers (e.g. monthly statement).

Workers recognize that electronically-stored data ("electronic images") can be processed much quicker, more reliably and less subject to error. But to do so, one must first capture an accurate image, or modified image, of the physical document and convert this into electronic computer (EDP) signals. The EDP image-signals can then be manipulated (e.g. be reproduced for visual review, be sorted and distributed, etc.) much more rapidly, easily and reliably than physical documents.

A more conventional system for "electronic image-lift" might use a video camera by which an operator views the front and back of the actual document as desired. Based on what he sees, the operator can electronically enter document-data into a computer system; e.g., such things as check-amount, account number and other data necessary for processing document transactions. Our system disfavors such physical viewing; it is too labor-intensive, is subject to error (e.g. from operator fatigue) and is substantially slower than an automated image-capture arrangement.

CONVENTIONAL APPROACHES

Workers are beginning to think of using imaging technology as a way of improving document processing, as disclosed, for example, in U.S. Pat. Nos. 4,510,619; 4,205,780; 4,264,808; 4,672,186 and 5,089,713. Generally, such imaging involves optically scanning documents to produce electronic images that are processed electronically and stored on high capacity storage media (such as magnetic disk drives and/or optical memory) for later retrieval and display. It is apparent that document imaging can provide an opportunity to reduce document handling and movement, since the electronic images can be used in place of the actual documents.

It would be somewhat conventional to effect "image capture" with video cameras; e.g. using two light sources, one to illuminate each side of a document. Successive document-images ("image slices") could then be reflected from the document, front and back, into respective front/rear video cameras. These can convert the optical image into electronic signals; which can then be converted by appropriate circuitry into digital signals.

This invention addresses such problems; e.g. teaching use of high-intensity, well-cooled light source means integrated into a Lambertian structure, and housed with associated optical components in a single overall, sealed structure with camera (sensor) means. Also, the taught arrangement is preferably modular (e.g. to plug-in to a relatively conventional check sorter); and it should simplify service and manufacture by using interchangeable, easily-installed components. The system disclosed uses a simple lamp-housing Lambertian cylinder, with internal surfaces coated for high reflectance, yet diffusing. The structure is adapted for use in a high speed, automated "image-lift" system; e.g. one capable of accommodating the present advanced needs of financial institutions for document processing.

An object hereof is to address at least some of the foregoing problems and to provide at least some of the mentioned, and other, features and advantages.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 1A is a flow chart showing typical check processing functions, while

FIG. 9 is a very simplistic, conceptual sketch of one Lambertian cylinder light source/image sensor embodiment, while

DESCRIPTION OF PREFERRED EMBODIMENT

Overall document processor concepts will be discussed; then details of our preferred Lambertian illuminator means the methods, materials, devices and means discussed herein will be generally understood as implemented and operated according to known expedients and present good practice, except otherwise specified.

DOCUMENT PROCESSOR BACKGROUND

Before giving more details of the subject image-lift embodiment, it will help to indicate an exemplary use-environment in which such an embodiment can be employed. Such is the document handling arrangement we show in FIGS. 1–7 (called "System DH").

Figure 2A:
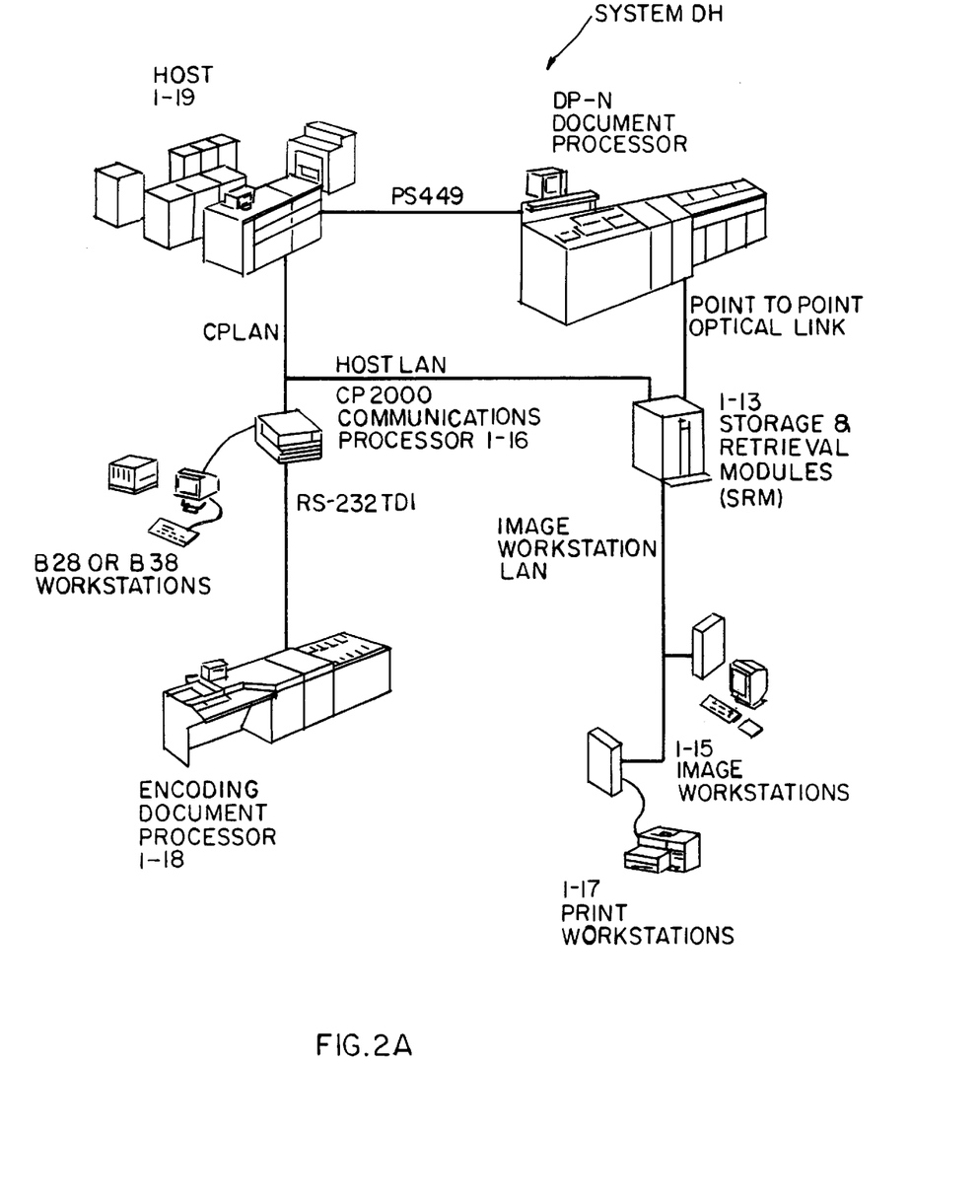
FIG. 2A is a perspective schematic of an idealized Document Handling System DH apt for using our invention.

In FIG. 2A, System DH may be seen to comprise a Document Processor 1-11 coupled to a Host Computer system 1-19) and one or more Storage/Retrieval modules (SRM) 1-13. Workers will understand that documents (e.g. checks, etc.) are to be fed into Processor 1-11 and rapidly transported thereby past various processing-stations (e.g. microfilm and imager as described below) to wind-up in one of several sort-pockets (see FIGS. 2b, 3). An "Electronic-image" of each document is "lifted" and sent to a designated SRM 1-13 for storage (e.g. on disks, as known in the art). The SRM(s) communicate with Host 1-19 and with various Workstations (e.g. one of more Image Workstations 1-15; a Print Workstation 1-17). System DH also includes an Encoder 1-18 (e.g. to imprint MICR characters on checks) and related communications and workstations units.

Figure 2B:
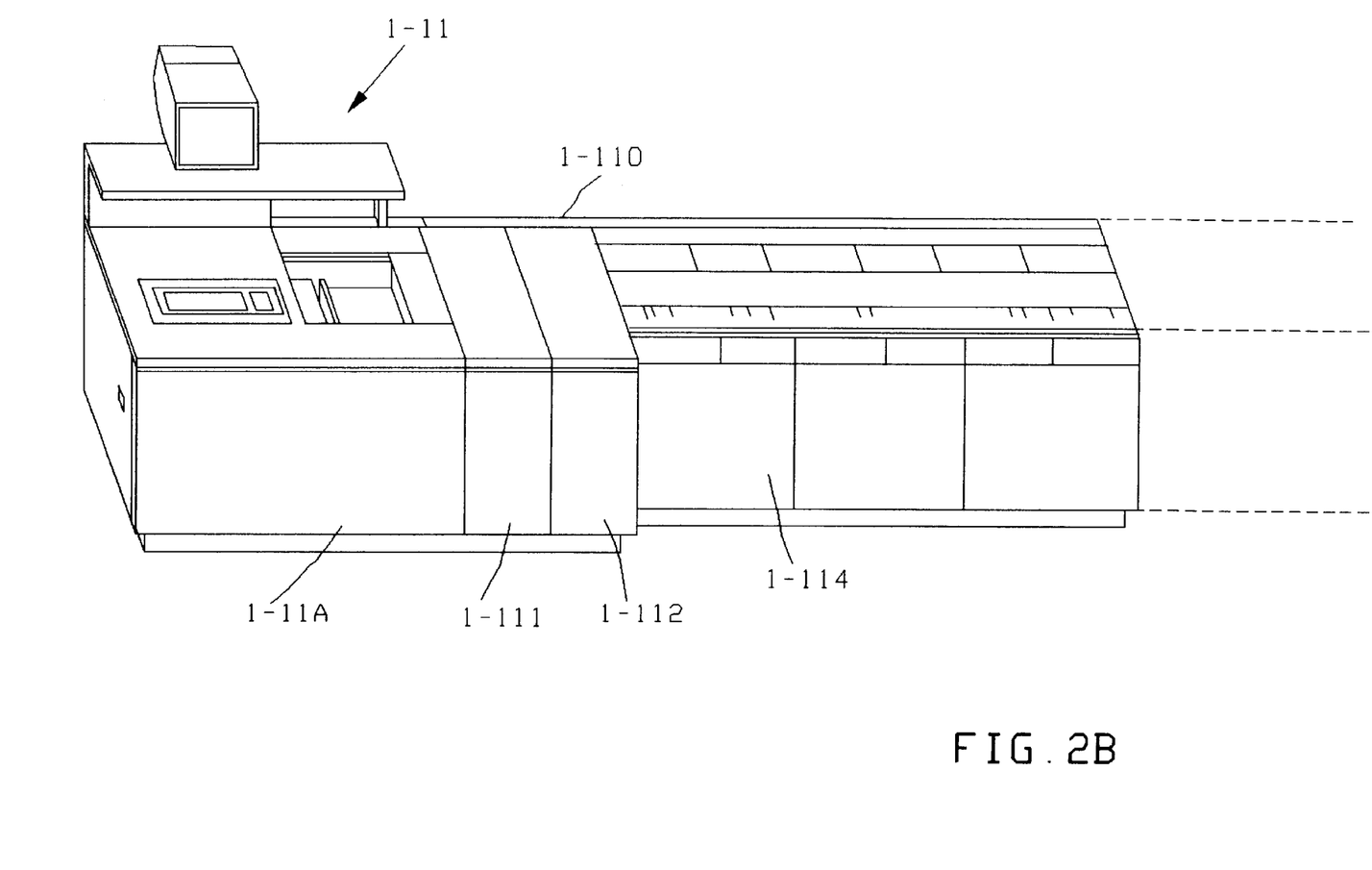
FIG. 2B is an idealized perspective of a Document Processor portion of this system DH; with FIG. 3 showing portions thereof in side view and very schematically.
Figure 3:
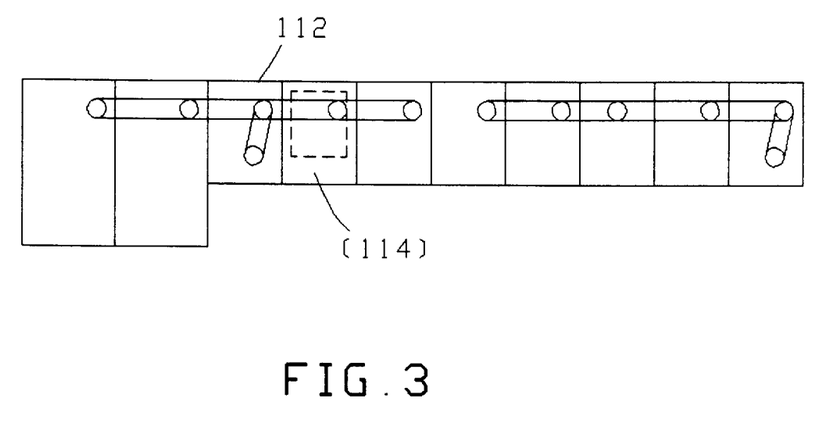
Figure 4:
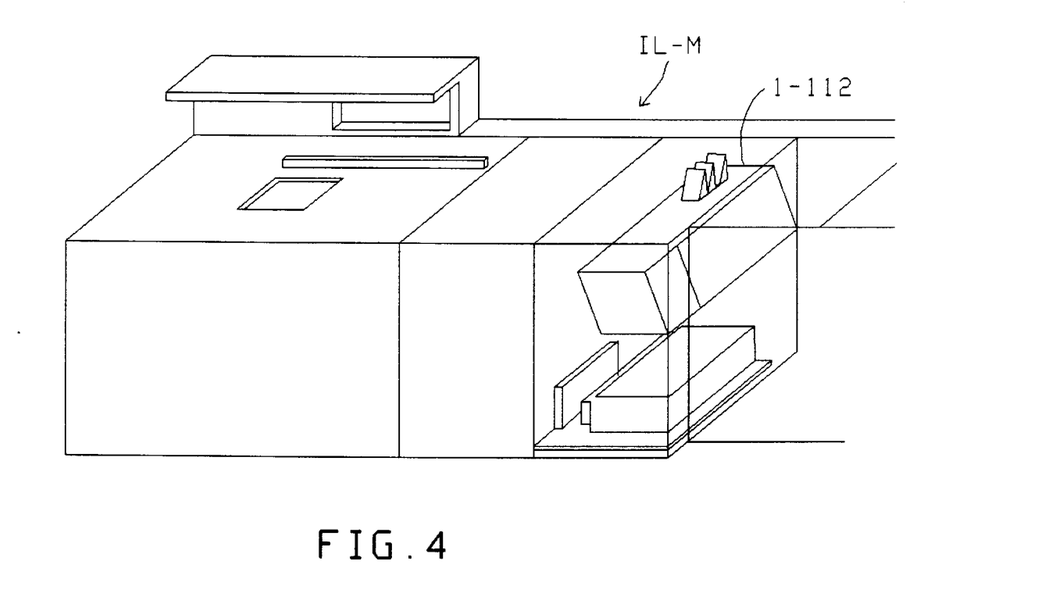
FIGS. 4, 5 showing in partial-perspective certain submodules thereof.
Figure 5:
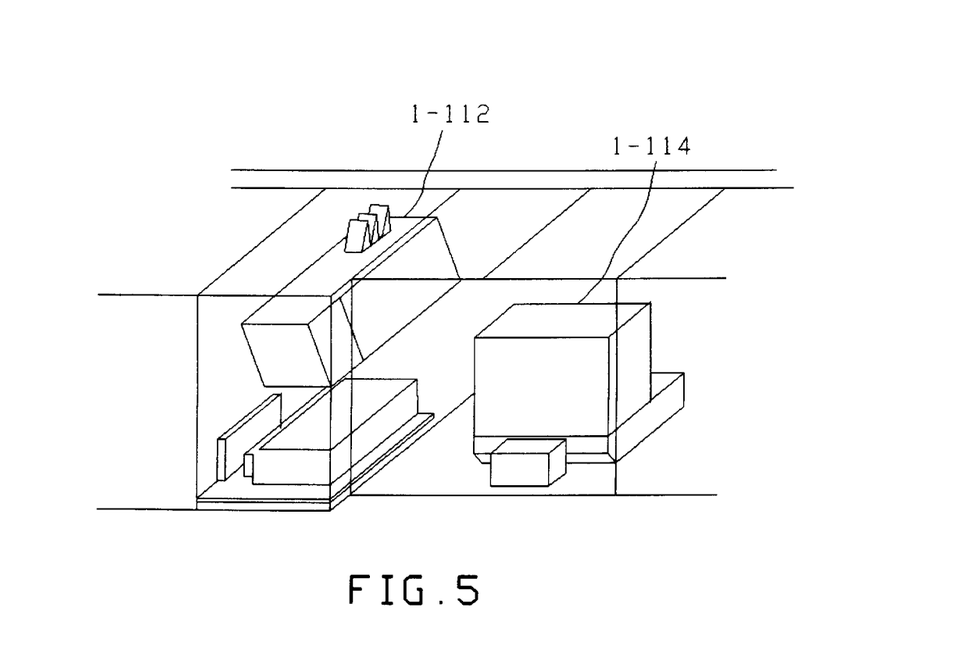
Figure 6:
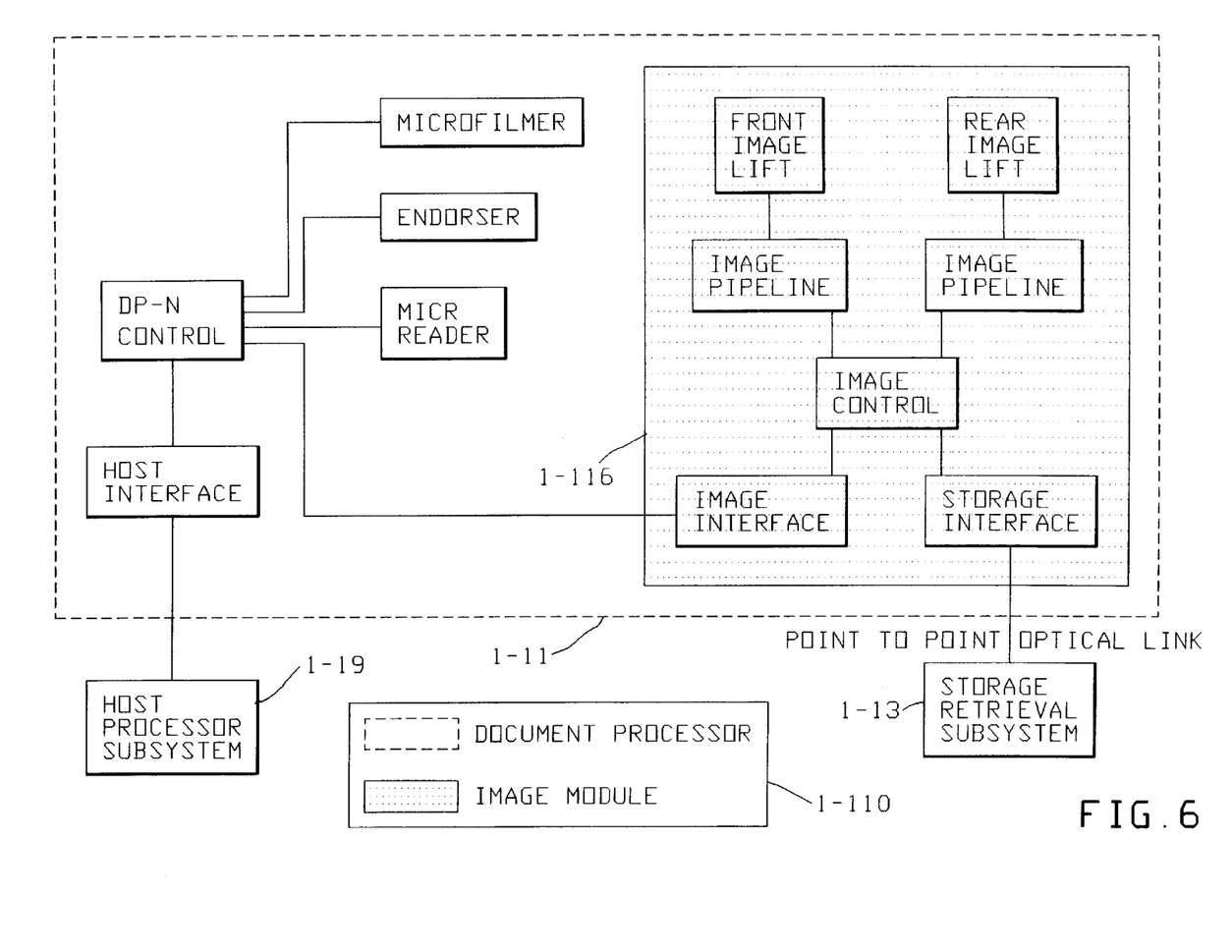
FIG. 6 is a block diagram showing functional units of this Document Processor; while FIG. 7 diagrams image-signal flow therein.
Figure 7:
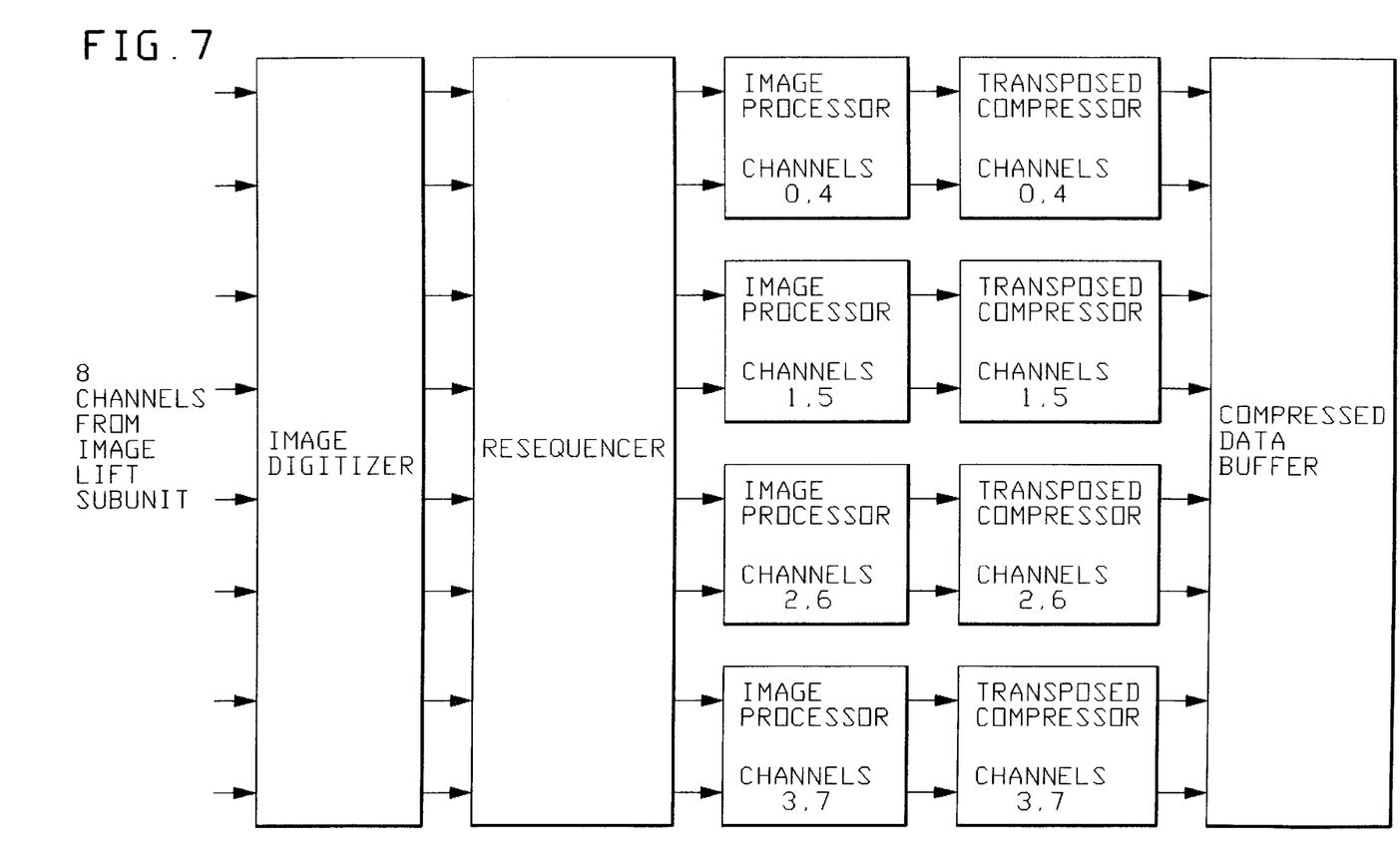

FIG. 2B indicates sub-units (modules) of Sort/Processor 1-11, including an image-lift camera module 1-112 and associated electronics submodule 1-114 (see FIGS. 4, 5). FIG. 3 indicates this in schematic side-view. FIG. 6 very schematically (block-diagrammatically) indicates imaging and other functional units; while FIG. 7 schematically indicates how some image-lift signals are processed. Other details of such arrangements may be found in our cited U.S. Pat. No. 5,089,713, hereby incorporated herein, to the extent relevant, by this reference.

Document images are to be captured at the real-time sorting speed of the document processor. For high-speed document processors, the sorting speed is about 1800+ documents per minute (300 inches a second, track speed); lower speed document processors sort documents at approximately 1000 (or less) documents a minute (e.g. 150 inches a second, track speed). Acquiring electronic representations of documents traveling at these speeds is a real challenge and requires specialized hardware and software.

Preferred Illumination Embodiment I —in general:

Details of our preferred Lambertian cylinder illuminator are given below, but first some general concepts will now be explained, referring to FIGS. 9, 10.

Figure 9:
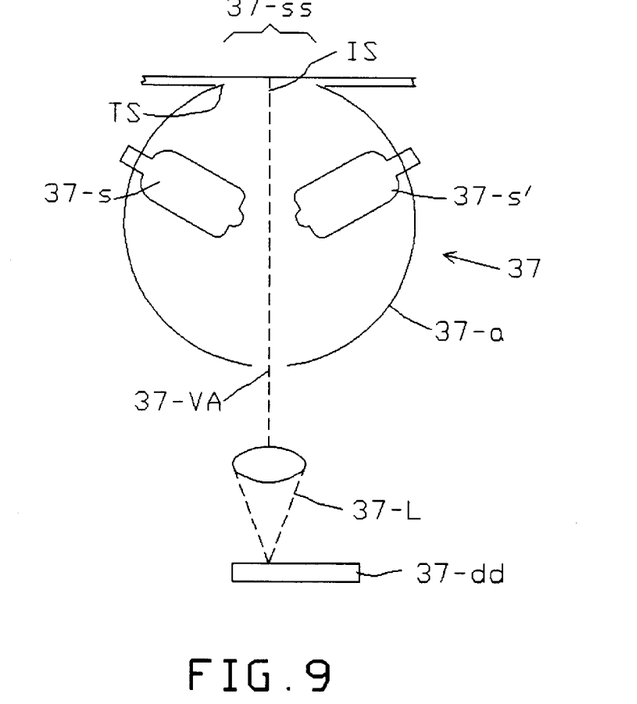

FIG. 9 is a top sectional view of Lambertian source means 37 illuminating a passing document track DT). FIG. 9 shows document track DT where subject documents are understood as transported at high speeds (as known in the art past a Lambertian illuminator unit 37 and a related document-imaging site IS, generally defined along DT by an imaging slit TS in the cylinder 37a of unit 37. At site IS, successive "slices" of the passing document are to be illuminated and "electronically imaged" as known in the art. Illumination of each site slit is to be with a special prescribed source of highly uniform, highly diffuse "Lambertian" light from cylinder 37a.

That is, illumination-site 1S, is to be illuminated with lamps in the ("hollow-integrating/Lambertian cylinder") light source 37 which projects a "bar" of intense, uniform (spatially) highly-diffuse light thru TS at site IS (facing the highly-cylinder slit from which the illumination emanates) to impact a passing "document slice".

Our preferred Lambertian source will be understood to generate an output with characteristics similar to a Lambertian emitter and distributed in linear fashion. The output will appear as a non-coherent source of monochromatic ( or panchromatic) light emitted from an aperture (cylinder slit) with a relatively high aspect ratio (length to width). The internal source(s) of luminance may be: incandescent bulbs, fluorescent lamps, gas discharge lamps, laser sources (or other optically pumped emitters) or other luminous sources such as the output of a fiberoptic bundle. The placement of the source(s) within cylinder 37a is not critical (only two shown in FIG. 9: 37-S, 37-S'), but may slightly impact output uniformity. The intensity profile as a function of distance from the exit aperture is very uniform and predictable and allows for a considerable "depth of illumination". As a feature hereof, components comprising this "Lambertian-cylinder" source are readily available, easily manufactured from standard materials and do not rely on the critical placement of any other component.

A typical embodiment for such a Lambertian source will include:

a. A hollow "integrating cylinder" (e.g. 37s, FIGS. 9, 10) provided with an illumination aperture (e.g. slit TS) cut along the cylinder axial-length [and radially offset from other such apertures]; it allows for the intromission of an array of light sources;

b. The cylinder interior is coated with a high-reflectivity Lambertian (diffuse) reflector;

c. The cylinder assembly is placed in proximity to the site (IS) of passing target documents requiring uniform illumination.

d. Note: light emitted from a source lamp(s) is reflected and scattered with very little loss throughout the entire internal cavity of the cylinder, eventually finding egress at the exit aperture (slit TS).

One preferred embodiment of such a Lambertian light source is very simplistically indicated in FIG. 9. This end view of the cylindrical source shows;

aa. A hollow cylindrical body 37a with its interior coated with a high reflectivity, diffuse material;

bb. Exemplary lamp means (37-S, 37-S') used to illuminate the interior of the cylinder cavity, producing multiple internal reflections before exiting the cylinder. Each lamp 37-S, 37-S' may be understood to represent one, or a set of identical sources; in the "least case", one may use only one lamp 37-S, with a second 37-S' kept as a standby.

cc. An emitted "slit" of light positioned in proximity to the document site (IS), the documents understood as moving across the slit of light.

dd. The light reflected from the document can returns back through the Illumination Aperture (slit TS), then out through a second Viewing Aperture (e.g. 37-VA), to Image-Lens means (37-L), to be imaged onto (sensed by) a linear sensor array [preferably a CCPD Detector Array or Camera, 37-d].

ee. The scan rate of the CCPD Camera is synchronized to the linear velocity of the object (e.g. document) so as to take repeated "slices" of the object as it passes.

Advantages of Lambertian Light Source

Lambertian characteristics of this light source inherently produce uniform and glare-free illumination.

There is no limit on the length of the exit aperture, which provides an unlimited, uninterrupted, uniform source of illumination. Fluorescent lamps approach this affect but are limited to maximum lengths of about 96 inches before another lamp is overlapped, or butted to the end of the previous one, and are, thus, usually non-optimal.

The luminous source in the cylinder can be selected to optimize system performance by using incandescent lamp sources if an Infrared-rich light is needed; fluorescent is preferred if a "cooler" light source is needed; a UV source is preferred if ultra-violet light is required; or other (preferably monochromatic) sources, depending on the system application and demands. All sources should produce a singular, uniform output of light from the cylinder.

The interior may, alternatively, be coated with a phosphorescent material (instead of the white reflecting/diffusing material) which, upon excitation from an appropriate source, will provide a similarly-uniform output. The color (wavelength) produced by the phosphor may also lend itself to optimizing system performance.

Superposing the illumination path onto the imaging path (as in FIG. 9) is a feature which provides simplified and compact packaging.

Figure 8:
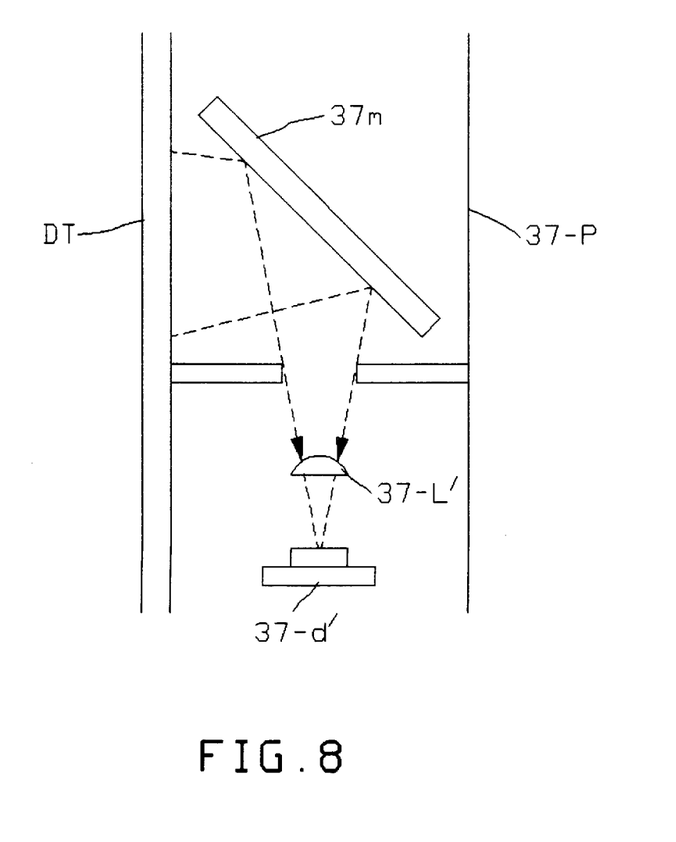
FIG. 8 is a very schematic side view of an image sensor embodiment.

Such a Lambertian Integrating Cylinder (e.g. 37), of itself, has advantages:

Higher optical efficiency than a reflector (e.g. vs. the more conventional array in FIG. 8, with mirror 37-m, image-clipper (view aperture) 37-P, lens means 37-L' and sensor means 37-d', all for documents along track DT').

Collects all the light from the lamp

Yet gives diffuse illumination, and avoids specular reflections from the document Needs no critical alignment or placement of the light source(s); or minimum number thereof.

Can be easily adapted to different lamps

Figure 11:
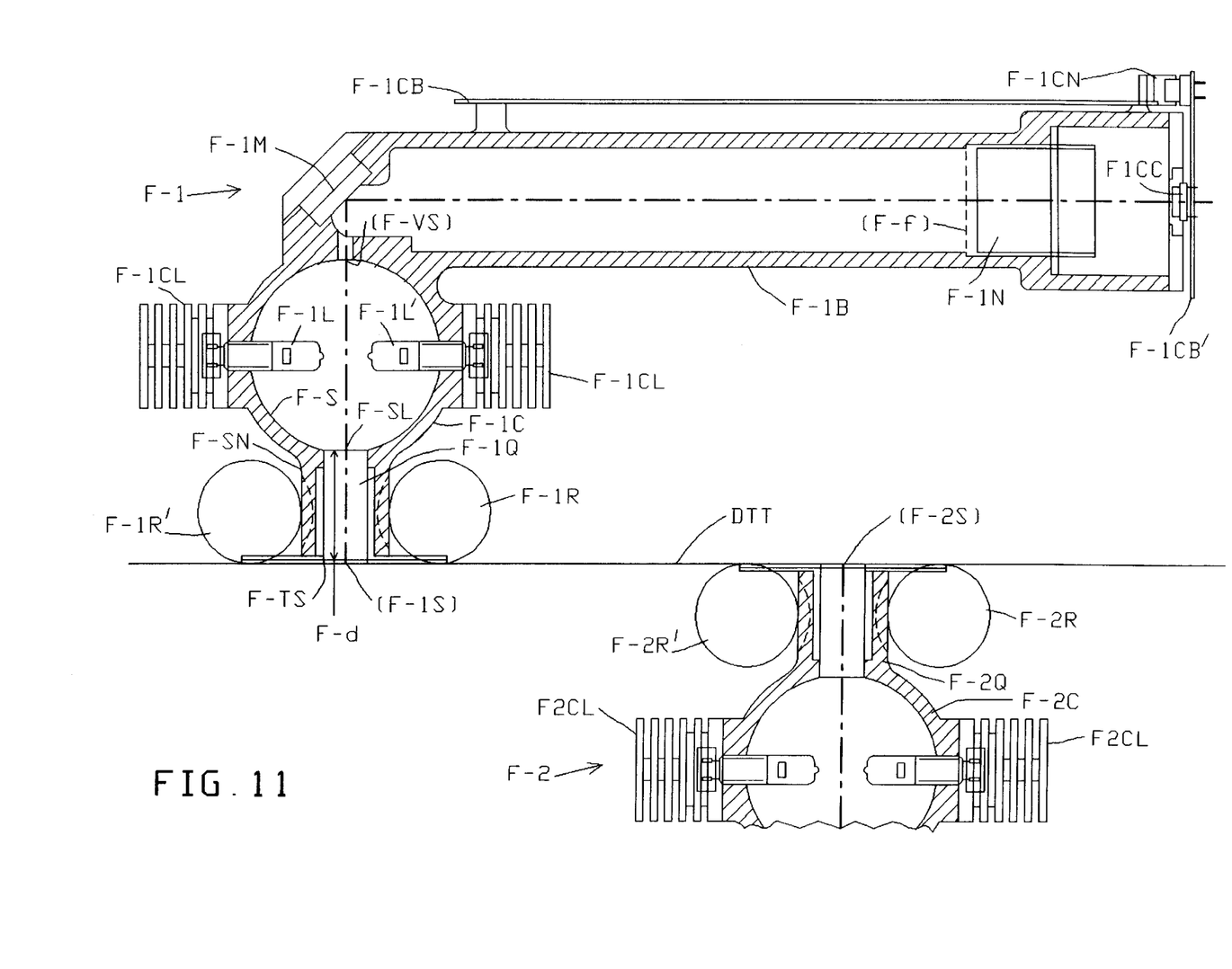
FIG. 11 is an elongate detailed sectional schematic section of a preferred combined illuminator/sensor array according to the invention.
Figure 12:
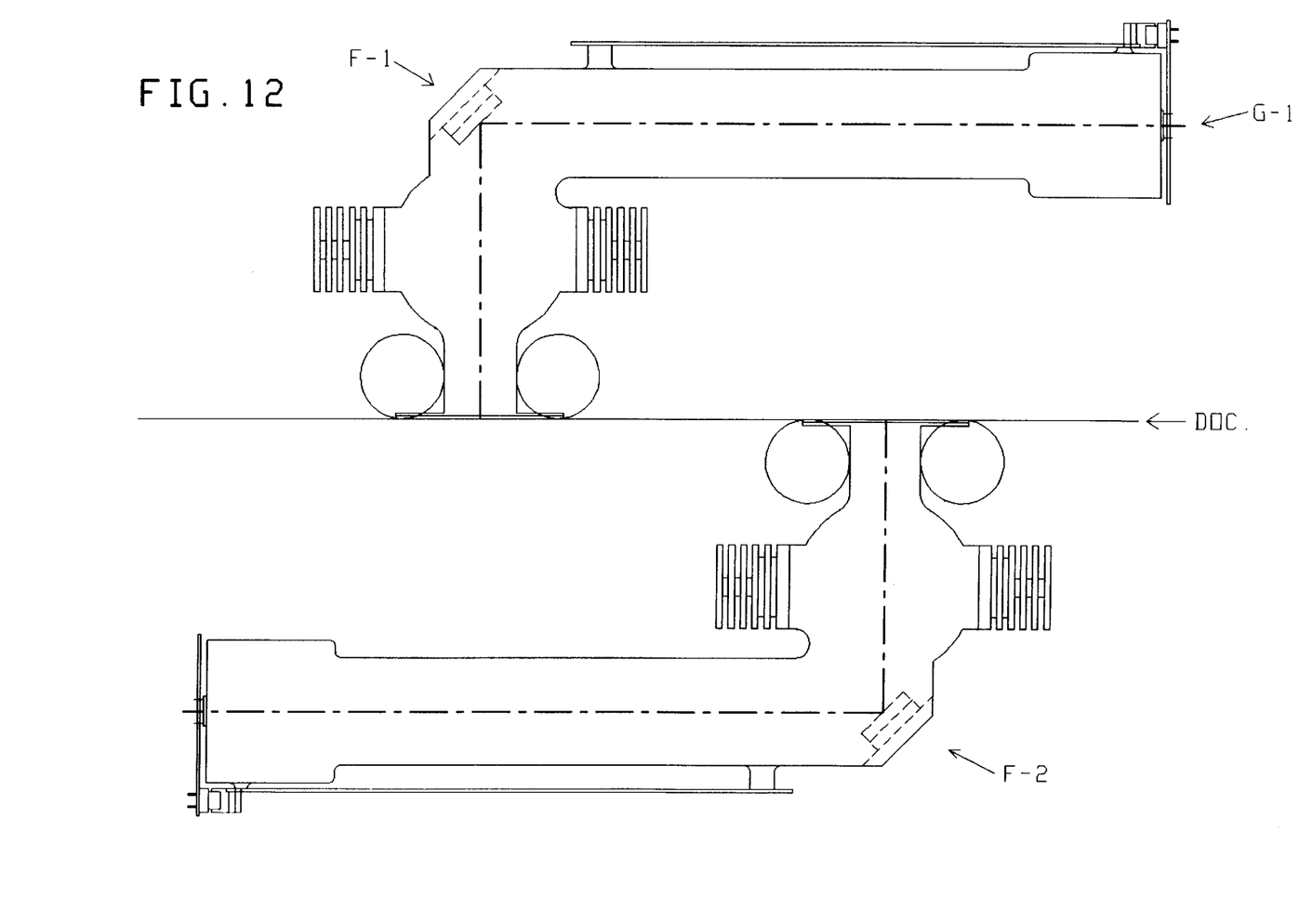
FIG. 12 is a simplistic plan view of two such preferred (Front/Rear) illumination-sensor arrays, shown offset along a document track.

Typically quite compact —e.g. can be 3 inches in diameter, 6 inches high in this embodiment. —Cylinder Components, in general Following are other general preferred characteristics for component parts of our integrating Lambertian cylinder embodiment [Figs. 9, 11, 12]:

1. Light Block

Preferably, the cylinder illumination slit (e.g. TS, FIG. 9) is filled with a glass seal, or "light block" at the track slit (e.g. filling F-TS, FIG. 11) designed to transfer light from inside the cylinder outward, with little attenuation, and improve illumination uniformity across (the depth of) the document track. This "block" allows document rollers to be positioned for better paper control. It could be replaced with a "mirror tunnel", but a block is cheaper and uses fewer parts. [Mirror tunnel could use infra red transmitting/visible reflecting mirrors to reduce IR to the document.]

The light block should have an anti-reflection coating on the two sides used for transmission, to avoid reflections. These sides can also have an IR blocking coating: other sides of the light block need no coating. Typically, the block is about: 0.75 inches wide, 1.7 inches long and 6 inches high (e.g. see FIGS. 11, 12 below).

2. Viewing Aperture

Figure 10:
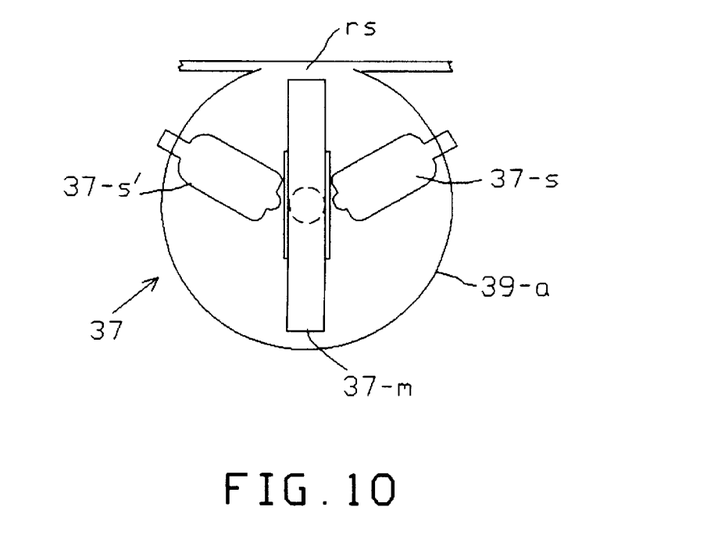
FIG. 10 shows the same with the sensor within the cylinder.

One could use a mirror inside the cylinder, for viewing through slit in the bottom (e.g. somewhat as in FIG. 8); or see mirror 37-M, FIG. 10) but the mirror would obstruct the interior. Or, one could place the camera (sensor) within the cylinder —though we disfavor this. Hence, we prefer to use the described viewing aperture (e.g. slit 37-VA, FIG. 9 or slit F-VS in FIG. 11) opposite the light block and track-slit (the entire camera can be mounted upon a baseplate). This viewing slit can, here, typically be 0.25 inches wide, 5 inches high, e.g. see slit S-VS FIG. 12).

3. Lamps

Surprisingly, the number and position of lamps is not critical; and no alignment is needed; thus replacement is easy for non-skilled operators; also a second string of lamps can readily be used for redundancy (back up).

For the uses indicated, we find Tungsten-Halogen lamps to be very appropriate; they are inexpensive, reliable, easily changed to give different wattage and different illumination levels. But, since high-wattage tungsten halogen lamps are apt to overheat the document, one should, in such cases, use an IR filter on the block, or else extinguish (i.e. block light therefrom) the lamp(s) if a document stops at the site.

One may even use a Xenon or other arc lamp placed outside the cylinder, with light therefrom directed into the cylinder thru an associated aperture; for this, one can place an IR filter outside the cylinder; but this is more costly then using tungsten halogen lamps within the cylinder, and is non-preferred.

Or, one may coat the cylinder with fluorescent powder and excite it with a UV source(s).

Here (e.g. FIGS. 9, 11, 12) we prefer to use five 35W tungsten halogen lamps for a 500 document/second machine, or five 100 W lamps for a 2000 docs/sec machine.

4. Cylinder coating

Advantageously, the cylinder walls need not be polished; also their exact shape and surface finish is not critical. A preferred coating is Barium Sulphate, or similar proprietary diffusing material that also imports high reflectivity (about 99% pref.). The coating should produce a diffuse Lambertian reflector. The coating can be modified with IR absorber or other dyes to alter spectral response.

5. Cylinder material

Preferably aluminum is used for the walls; it is easy to cast and machine, and easy to cool (heat generated from interior lamps). One may air-cool the cylinder walls, or use water cooling, depending on lamp wattage.

6. Spectral filtering

One may introduce filter means as needed, depending on the application. If using tungsten lamps, one may use an infra red stop-filter between the viewing slit and the CCPD detector to better image "ink marks". An IR "pass filter" is recommended if one wants to see only lead pencil marks or carbon based inks.

7. Document interaction

Note that the illuminated (passing) document forms (optically) part of the wall of the cylinder, so the illumination level on the document will depend on the document's reflectance [variations therein are usually not a problem in most applications: typical illumination change is less than 10%; and this effect is reduced if the document is spaced from the exit surface of the illumination block; e.g. 0.2 inch for a 0.75 inch wide block, though this reduces the level of document illumination. This effect is also reduced if the block is narrower; though, in such a case illumination intensity will be more dependent on the position of the document in the track; this effect is also ameliorated if the cylinder inner wall is coated with lower reflectivity material, say 90%, this reducing light to the document, of course]. Our solution: use a sensor to detect the illumination level inside the cylinder, and feed sensor output for electronic gain control or to vary power to the lamps.

Overall advantages of Lambertian illuminator:

Low initial cost

No critical adjustments

Minimize optical surfaces in the image path

Easily adapted to various lamps

Easily changed to different power levels

Excellent illumination uniformity of the document

Gives good images even from glossy documents

General Concept of Preferred Embodiment, FIG. 9

Our Lambertian illuminator means 37, in general, comprises an array of one or more lamps (e.g. 37-S, 37-S' in Fig. 9; can be one or more sets of identical halogen lamps), disposed in a cylindrical Lambertian housing 37a having a long, narrow illumination-slit TS adapted to direct (substantially all) the light from the lamps onto a given site IS. Housing 37a may be made of aluminum; its interior surfaces are diffusing/ reflective; i.e. are highly-reflective, and rendered highly-diffusing; e.g. preferably by coating with diffuse/reflecting material such as Barium Sulfate, coated in a matte finish on the smooth inner cylinder surfaces. Such a diffusing-reflector is preferred (e.g. vs. a conventional specular mirror surface) to reflect and mix the light, and to thus project a highly uniform non-directional beam thru the illumination slit TS, onto site IS.

For optimum effect (e.g. maximum efficiency) we prefer a diffusing/reflecting surface, like that given by the mentioned BaSO4 on polished aluminum, this providing about 100% reflectance at the involved wavelengths, and yet diffusing in, essentially, all directions (cf. an "omni-directional", "Lambertian" reflectance).

Image detection may be effected with detect means situated within the illuminating cylinder or external thereto, as indicated in FIGS. 9, 11, 12. In FIG. 9 a detector unit 37d will be understood as disposed and adapted, as known in the art, to receive the "image-slices" reflected, from the documents passing along track DT, at prescribed imaging site IS, back through illumination-slit TS, then viewing slit 37-VA (the slices typically being processed by conventional intermediate optics, such as the indicated focusing lens system 37-L).

"Internal image detection," as functionally suggested above, will be understood as effected with an interior detector unit and associated optics which are enclosed within the cylinder walls. In some instances, we will prefer to direct the image-slices from the documents to a reflector and thence past an "image exit aperture" having an aperture designed, as known in the art, —lest one "vignette" the image path, as workers will appreciate. In most cases we will prefer that such a reflecting surface be a Lambertian type surface as mentioned above regarding the interior of cylinder 37.

Preferred Embodiment details, FIGS. 11, 12

FIG. 12 illustrates a preferred illuminator/imager embodiment arranged and adapted( to accept the subject documents (see input, output arrows at "Doc.") and to image both document sides as before described; i.e. providing a Front Illumination-Imager unit F-1 and an identical Rear Illumination-Imager unit F-2, (offset from F-1 to avoid interference), each illuminating successive "slices" of a respective document side and directing the reflected "image slices" to a suitable detector stage therein, as aforementioned.

FIG. 11 is an enlarged sectional showing of one such Illumination-Imager unit F-1. Imager F-1 will be seen as, essentially, organized much like unit 37 in FIG. 9; i.e. to direct illumination, from lamp means F-1L, F-1L' to the respective imaging-site (F-1S, in phantom along document transport track DTT) and to conduct the resultant reflected image slices back, thru view-slit F-VS, via mirror F-1M, to associated detector means F-1CC (preferably a CCPD as aforedescribed) via suitable optic means (see lens F-1N), along a rectangular enclosure F-1B (camera body) housing these components as known in the art. Workers will recognize that camera body F-1B may also usefully mount (externally) associated circuit boards (e.g. F-1CB, F-1CB') on related electrical connector means (e.g. plug F-1CN).

The hollow Lambertian cylindrical lamp housing F-1C will be constructed and operated generally as aforedescribed (FIG. 9) to house lamps F-1L, F-1L' except as otherwise specified; e.g. its inner surface F-S is made highly diffusing/reflective and is preferably coated with a superior "diffuser/reflector-coating", like BaSO4, applied thereon as aforedescribed. The lamp source means F-1L, F-1L' may preferably each comprise an array of two or more identical halogen lamps, distributed along the axial length of the cylinder cavity. [Or one set of sources F-1L, F-1L' may be omitted, or used as a "backup".] Each lamp will preferably be adapted to project intense "spectral" light having a wavelength range adapted to match the optimal response of the associated system and detector (F-1CC), as reflected within camera F-1 (i.e. by walls of cylinder F-1C, transmitted through illumination slit F-S, filled with glass light-guide F-IQ reflected by the document back thru F-SL, then F-VS, then by mirror F-1M and lens F-1N), passing image-slit F-VS in cylinder F-IC. Illumination slit F-SL in cylinder F-IC is matched by a like slit (aperture) F-TS at the other end of guide F-G coupling F-IC to track DTT, and filled with glass block F-IQ.

Here, we prefer each set F-IL, F-IL' to comprise five identical 100-watt Quartz Halogen lamps, emitting light in the 450–750 Nm. (visible) range. The entire spectral output range of the lamps may be used if required; and lesser wattage will be acceptable in certain instances. These will give a maximum uniform diffuse intensity thru the illumination slit F-SL. Slit F-SL will typically be of document-height, or about 6"high, and about 0.75" wide.

Note: the 5 mil thick documents typically pass along transport track DTT which is about 90 mils wide —so one should keep illumination uniform across this 90 mil, ("depth-of-illumination") and up the 6" height, at the imaging site F-IS.

We find that the slit-width Ws (of cylinder slit F-SL, and of guide slit F-TS) can be controlled to optimize uniformity of illumination. Across width Ws the illumination intensity (I) is apt to have a "Gaussian" (Bell-curve) distribution. While varying Ws will vary intensity-uniformity, a range of Ws can be found giving fairly uniform intensity —with the sources appearing to originate at the slit, giving fairly good diffusion (i.e. coming from a wide range of incidence angles).

More critical however is intensity-uniformity along the depth-direction, or z-axis (Iz), since this can vary more with slit-width Ws. For instance, with this Preferred Embodiment (FIG. 11; e.g. assume that cylinder F-IC has an inner diameter of about 3", and that slits F-VS, F-SL, F-TS are about 6" high), we have found Iz uniformity best where Ws =0.75" (cf. "flat" across a 0.25" span); and "satisfactory" for Ws =0.5", but "poor" for Ws ≦0.25" or Ws ≧1.0" (Ws =width of slit F-sL in cylinder F-1C —and track slit F-1S). So workers will want to test this Iz uniformity vs. varied Ws (e.g. with a white reflectance standard to find a Ws value giving satisfactory uniform intensity Iz across the track; typically, a given Ws will yield max Iz which peaks sharply in-track; while a slight shift of Ws will drop Iz a bit but desirably "flatten it across the track" —this is usually preferable).

As mentioned, the preferred light sources here are incandescent halogen lamps which give the indicated desired illumination (cf. 450–700 Nm. wavelength) continuously, with the appropriate current-input.

Alternative lamps are: Xenon arc, Tungsten filament and fluorescent (assuming their intensity is adequate, and their phosphors yield the indicated wavelength-range —e.g. "green phosphors" as used in FAX or Xerox systems are usually suitable). The F1-CC sensors should be approximately matched in sensitivity to the lamp output. It is also possible to coat the inner cylinder surface F-S with a phosphor (instead of BaS04) and illuminate with a suitable UV source.

Fortunately, we find that the subject cylindrical housing F-1C disguises the actual in-cylinder location of the lamp(s) used therein (given its high-reflectivity/highly diffusive interior cylinder surface as mentioned; i.e. a diffusing-reflector —vs. a mere specular, mirror-like reflector which cannot do this). Thus, the number and location of the lamps used may be rather loosely specified, as a feature of advantage.

While a single set of lamps is adequate, a second set may be preferred (e.g. for back-up in case one set "fails"). Thus, we specify each lamp "set" as a unitary array of identical lamps (one or more, in the general case, as needed), with the "set", itself, providing well-beyond "adequate illumination" to the passing documents [i.e. "net illumination" adequate for satisfactory output across entire F1-CC, CCPD, array, after reflection/diffusion within cylinder F-1C, then reflection from document and mirror, and then passage through intermediate optics —c.f. 500+watt lamps found preferable here, assuming use of silicon-cell sensors F1-CC, having good response from 450–1100 Nm., with peak response about 900Nm].

Optionally each lamp "set" comprises two or more lamps, with one set normally "lit", and the system arranged to automatically switch to the other set when the normally-lit set begins to degrade/fail —doing so quickly, before the failing-lamp cools very much.

Thus, we also prefer to include "power-sensing" means in this system to quickly and precisely detect a prescribed change in input voltage/current to the lamps and to respond quickly, and switch-on an alternate lamp set.

Preferably, the embodiment (FIG. 11) cylinder F-1C is, displaced a certain distance F-d (e.g. here, about 1.75" preferably) away from track DTT to accommodate interposition of certain elements such as transport (document-drive) rolls F-1R, F-1R' and associated belts, etc. arranged and adapted to maintain a prescribed document speed along the track past illumination slit F-sL. Thus, cylinder F-1C is preferably provided with "optical coupling means" or light guide, such as a glass block, F-IQ coupling the light from housing slit F-sL to the document track, without appreciable loss in illumination (e.g. intensity). Thus the light will appear to originate from the distal end of block F-IQ adjacent the track-slit (illumination site F-1S). Solid, rect-angular glass block F-IQ is preferably about 1.75" long (F-d) and is made of optical Quality glass adapted for this bilateral (two-way; i.e. IN and OUT) light-coupling; and has an exit aperture F-TS matching the dimensions of the cylinder illumination slit F-sL (e.g. preferably 6"×0.75", here). Also, block F-IQ is preferably housed in a protective opaque tube (snout F-SN) coupled to cylinder F-IC (e.g. cast to be integral therewith).

The inner surface F-S of cylinder F-1C is preferably polished, and made highly reflective and also highly-diffusive (e.g. with the matte BaSO4 coating mentioned) for the indicated light (wavelengths), so that the document will be illuminated from a wide variety of incident angles and so that reflecting-geometries of the cylinder interior become less critical. Thus, surface F-S will be made highly "Lambertian" (e.g. so light source location and lamp-filament etc. are not apparent at imaging site F-1S —vs. "specular reflection" when source location is apparent as a "hot spot"). Similarly, the (six) facets of glass block F-1Q are highly polished to promote total internal reflection therein, as known in the art (i.e. of light from slit F-SL to track slit F-TS).

Note: Reflection from "white" portions of the documents throw a high percentage of the incident light back to cylinder F-1C and thence to detector unit F1-CC, after reflection from mirror F-1M and focusing by lens F-1N, etc. Obviously, the "darker" document portions send a much lower net intensity to detectors F1-CC. Thus, a user should, after settling on a slit-width, test for the minimum acceptable contrast between black and white for all positions of the document across the (0.09") width of the track.

And, workers will be aware that, despite all precautions, the light-wavelengths incident on detectors F1-CC may not be optimized (e.g. gray level contrast may be poor for specific colors like reds or blues); in which case a detector-trim filter F-f may be desirable to interpose in the imaging path for the mentioned purpose; preferably on the front of the image lens F-IN (FIG. 11). In certain cases however the inner reflecting/ diffusing surfaces of cylinder F-1C may be adapted to attenuate, or eliminate, undesired wavelengths from the lamps, so that such a detector trimmer filter won't be needed.

Infra-red (heat) may be a problem —e.g. it is troublesome if conveyed to the CCPD detectors (e.g. due to its tunneling effects into the silicone substrate of the detector) and can degrade other components (e.g. BaS04 breaks down above 60° F., shifting the distribution of diffused wavelengths). Thus, it will typically be preferable to cool housing F-1C and to make mirror F-1M a "heat-dumping" type, as known in the art. Also, workers may prefer to cool the quartz block F-IQ.

Thus, it will typically be preferable to cool the walls of cylinder F-1C —e.g. with radiator fins F-1CL, F-1CL' preferred for this purpose, and especially to cool the lamps, as, known in the art. (Cooling fans may also be added; and/or cooling ducts within, or upon, the walls of cylinder F-1C as: known in the art (e.g. a cooling jacket applied thereto.)

Further, these inner cylinder walls may be treated to absorb IR.

RESULTS

Such illuminating-cylinder arrays (F-1, F-2) are found to provide document-illumination/-detection of a surprisingly high quality, yet do so with a very few simple components, and relatively non-critical geometries. Illumination uniformity is particularly good, without the "hot spots" etc. of conventional sources, yet with superior intensity and non-directionality (multi-directional illumination of documents).

For example, some conventional optics are thus dispensed-with; eliminating elements which are unnecessarily expensive, complicated and too geometry-critical (e.g. we use just one simple mirror and one simple focusing lens, here; no need for beam-shaping means like fiber bundles) and require considerably more fussy adjustments.

And, while such "Lambertian illuminating-cylinder" arrays are here seen as particularly advantageous for use with automatic, high-speed document imaging scanners, as described, workers will appreciate that they have utility for other analogous applications, such as for high-speed imaging and/or copying (e.g. by xerography; cf. drum illumination) or for optical character recognition/reading generally.

Our high-reflectivity/high diffusion hollow "integrating Lambertian cylinder" will be seen to give light which is highly uniform, yet more "multi-directional" than usual, and is very apt for avoiding problems from creases, folds, etc. in documents (e.g. less "shadowing" therefrom).

In conclusion, it will be understood that the preferred embodiments described herein are only exemplary, and that the invention is capable of may modifications and variations in construction, arrangement and use without departing from the spirit of the claims.

For example, the means and methods disclosed herein are also applicable to other related illumination (e.g. other imaging systems. Also, the present invention is applicable for enhancing other forms of illumination and related optical arrangements.

The above examples of possible variations of the present invention are merely illustrative. Accordingly, the present invention is to be considered as including all possible modifications and variations coming within the scope of the invention as defined by the appended claims.

What is claimed is:

1. An arrangement for illuminating and imaging checks in a check-processing system wherein a large number of checks are rapidly, continuously transported past one or more imaging stations, each station having a prescribed source means comprising a Lambertian integrating cylinder which projects a highly-uniform, yet highly diffuse illumination-beam.

2. The arrangement of claim 1 wherein there are two stations each with a respective illumination beam, the two beams being balanced and matched in intensity.

3. A system for illuminating checks in a check-processing system wherein a large number of checks is rapidly transported past one or more imaging stations, each station having a prescribed respective imaging-site which is illuminated by prescribed source means which projects an illumination-beam thereto; each said source means compromising: a hollow Lambertian integrating vessel, including one or more sets of identical lamps disposed uniformly along the cylinder axis, and imaging aperture means adapted to project the energy of its said lamps to its respective said imaging-site.

4. The system of claim 3 wherein there are two said stations, each with its respective imaging site and associated illumination beam and where the two beams are "balanced" and "matched" in intensity, each being highly-diffused and highly uniform in intensity.

5. In a check processing system wherein a large number of checks is rapidly, continuously transported past two or more imaging stations, each station having a prescribed imaging-site, illuminated by a respective illumination beam from prescribed Source means; each said source means comprising a hollow Lambertian vessel with one or more lamps therein and having a Lambertian reflecting/diffusing inner vessel-wall, and adapted to project, thru an associated slit, an illumination beam to a respective site which is highly-diffused, yet of very uniform, intensity.

6. A Check-Sorter apparatus with an Imager unit having at least one imaging site, each lit by a beam from a respective source means, each source means comprising a hollow integrating Lambertian vessel having reflective/diffusing inner walls and housing one or more lamp means, therein plus an illumination-aperture adapted to illuminate its respective imaging site with a beam that is highly-diffuse, yet of highly-uniform intensity.

7. The innovation of claim 6 wherein said vessel is cylindrical.

8. The invention of claim 6 wherein said unit also includes camera means responsive to check-reflections, and wherein said vessel also has a viewing aperture for conducting check-images reflected back thru said illumination-aperture to said camera means.

9. The invention of claim 8 wherein said vessel is cylindrical.

10. The invention of claim 8 wherein said camera means is provided external to said vessel.

11. The invention of claim 8 wherein at least one set of identical lamps is disposed within said vessel.

12. The invention of claim 11 wherein said lamps are the Quartz Xenon type.

13. The invention of claim 12 wherein radiation sensor means is also provided within said vessel to monitor the intensity of the lamps radiation and responsively provide an output to associated control means.

14. The invention of claim 13 wherein said control means includes means for adjusting input-wattage to the lamps.

15. The invention of claim 8 wherein said illumination-aperture is adapted to shape the output beam from said vessel and includes light-guide means optically coupling said vessel to the respective imaging site.

16. An arrangement for illuminating and recording the printing on documents in a document-processing system wherein a large number of documents are rapidly, continuously transported past one or more imaging stations, each station having a prescribed illumination source means comprising one or more lamp means in an integrating housing which is characterized by reflecting surfaces which are treated to be highly-diffusive and by slit means which thus projects a highly-uniform, yet highly diffuse illumination-beam.

17. A system for illuminating documents in a document-processing system wherein a large number of documents are rapidly transported past one or more imaging stations, for imaging document markings, each station having a prescribed respective imaging-site which is illuminated by prescribed source means which projects an illumination-beam thereto via associated slit means; each said source means compromising: a hollow integrating vessel, including one or more sets of identical lamps and inner reflecting-diffusing surface means adapted to project the energy of its said lamps to its respective said slit means and imaging-site.

18. In a document processing system wherein a large number of documents are rapidly, continuously transported past two or more imaging stations, for imaging documents markings, each station having a prescribed imaging-site, illuminated by a respective illumination beam from prescribed source means through associated slit means; each said source means comprising a vessel with one or more lamps therein and having reflecting/diffusing inner-surfaces, and adapted to project, thru said associated slit, an illumination beam to a respective site which is highly-diffused, yet of very uniform intensity.

19. A Document-Sorter apparatus with an Imager unit having at least one imaging site, each site lit by a beam from a respective source means via associated slit means; each source means comprising an integrating vessel having reflective/diffusing inner surfaces and housing one or more lamp means therein, being adapted to illuminate its respective slit means and imaging site with a beam that is highly-diffuse, yet of highly-uniform intensity.

20. The innovation of claim 19 wherein said vessel inner surfaces are cylindrical.

21. The invention of claim 19 wherein said Imager unit also includes camera means responsive to document-reflections, whereby to reproduce markings thereon and wherein said vessel also has a viewing aperture for conducting document-images reflected back thru said slit means to said camera means.

22. The invention of claim 21 wherein at least one set of identical lamps is disposed within said vessel.

23. The invention of claim 22 wherein said lamps are the Quartz Xenon type.

24. The invention of claim 19 wherein radiation sensor means is also provided within said vessel to monitor the intensity of the lamp radiation and responsively provide an output to associated control means.

25. The invention of claim 24 wherein said control means includes means for adjusting input-wattage to the lamps.

26. The invention of claim 19 wherein said slit means is adapted to shape the output beam from said vessel and includes light-guide means optically coupling said vessel to the respective imaging site.

27. In a document processing array, an imaging/illumination arrangement for illuminating and imaging the markings on documents via one or several imaging-stations, at imaging-sites thereof, as the documents are rapidly, continuously transported past the sites, each station having, as its illumination source, an integrating vessel housing lamp means and characterized by inner reflecting/diffusing surfaces which, project a highly uniform, diffuse Lambertian illumination-beam to its respective imaging site.

* * * * *